US006676098B2

United States Patent
Lin

(10) Patent No.: US 6,676,098 B2
(45) Date of Patent: Jan. 13, 2004

(54) PLANE DISPLAY WITH A FOLDABLE SUPPORT

(75) Inventor: Wen-Pin Lin, Jungli (TW)

(73) Assignee: Quanta Computer, Inc., Taoyuan (TW)

( * ) Notice: Subject to any disclaimer, the term of this patent is extended or adjusted under 35 U.S.C. 154(b) by 0 days.

(21) Appl. No.: 10/266,725

(22) Filed: Oct. 8, 2002

(65) Prior Publication Data

US 2003/0197101 A1 Oct. 23, 2003

(30) Foreign Application Priority Data

Apr. 18, 2002 (TW) ...................................... 91205210 U

(51) Int. Cl.[7] .............................................. A47G 29/00
(52) U.S. Cl. ..................... 248/371; 248/372.1; 248/398; 248/917; 248/919; 248/923; 361/681; 361/682
(58) Field of Search ............................... 248/371, 372.1, 248/398, 917, 923, 919; 361/681, 682; 16/342, 337

(56) References Cited

U.S. PATENT DOCUMENTS

| | | | | |
|---|---|---|---|---|
| 3,970,274 A | * | 7/1976 | Resk ........................ 248/185.1 |
| 4,527,766 A | * | 7/1985 | Krenz ........................ 248/371 |
| 4,882,807 A | * | 11/1989 | Frye et al. .................... 16/225 |
| 5,028,913 A | * | 7/1991 | Kitamura ..................... 361/681 |
| 5,100,098 A | * | 3/1992 | Hawkins .................... 248/291.1 |
| 5,372,347 A | * | 12/1994 | Minnich ...................... 248/371 |
| 5,593,119 A | * | 1/1997 | Moore et al. ............. 248/185.1 |
| 5,649,309 A | * | 7/1997 | Wilcox et al. ................. 455/90 |
| 5,666,694 A | * | 9/1997 | Slow et al. .................... 16/368 |
| 5,799,372 A | * | 9/1998 | Brunner et al. ................ 16/342 |
| 5,923,751 A | * | 7/1999 | Ohtsuka et al. ......... 379/433.13 |
| 6,212,067 B1 | * | 4/2001 | Nakajima et al. ............ 361/681 |
| 6,231,021 B1 | * | 5/2001 | Hong ......................... 248/371 |
| 6,304,432 B1 | * | 10/2001 | Kim .......................... 361/681 |
| 6,453,509 B1 | * | 9/2002 | Shin ........................... 16/340 |
| 6,459,887 B2 | * | 10/2002 | Okuda .......................... 455/90 |
| 6,502,792 B1 | * | 1/2003 | Cho et al. .................... 248/121 |
| 6,530,784 B1 | * | 3/2003 | Yim et al. ..................... 439/31 |

* cited by examiner

Primary Examiner—Leslie A. Braun
Assistant Examiner—Amy J. Sterling

(57) ABSTRACT

A plane display with a foldable support. The plane display comprises a base and a back plane mounted on a plane display panel. The back plane pivots on the base by a sleeve. The connecting rod is disposed in the sleeve, and slides between a first position and a second position. An L-shaped member is fixed on the connecting rod. When the connecting rod is in the first position, the L-shaped member secures the back plane to the base at a first angle. When the connecting rod is in the second position, the L-shaped member releases the back plane from the base, and the back plane rotates with respect to the base to a second angle.

16 Claims, 6 Drawing Sheets

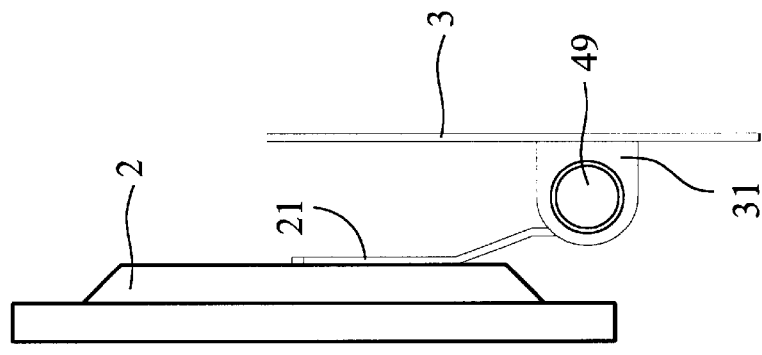
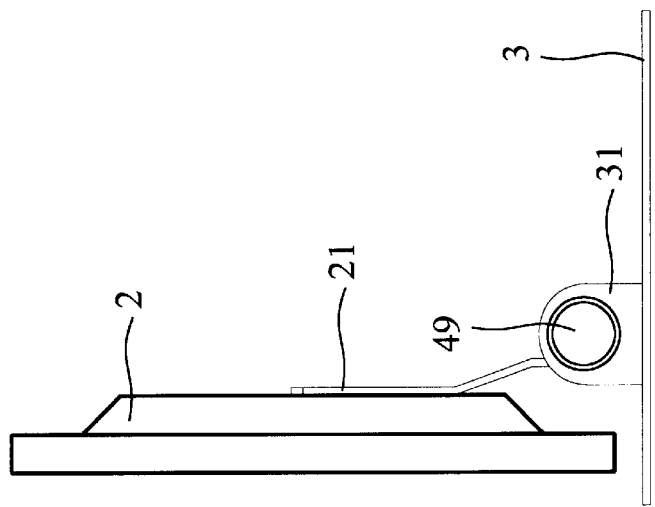

PLANE DISPLAY WITH A FOLDABLE SUPPORT

BACKGROUND OF THE INVENTION

1. Field of the Invention

The present invention relates to a plane display, and more particularly, to a plane display with a foldable support.

2. Description of the Related Art

Liquid crystal displays (LCD) are popular plane displays. Compared to cathode ray tube displays (CRT), LCDs have advantages of lower radiation, lower power consumption and smaller profile. FIG. 1 is a schematic side view of a conventional LCD, including an LCD panel 11, a connecting hinge 13, an arm 15 and a base 17. The LCD panel 11 is connected to a computer through a cable. The LCD panel 11 is rotatably connected to the arm 15 extending from the base 14 by the shaft 13. Thus, users can change the vertical position and the observation angle of the LCD panel 11.

The profiles of plane displays, such as LCDs, are smaller than conventional CRT displays. Plane displays, however, usually have large and wide bases with weights to balance and protect them from falling. Plane displays with large bases, however, require large packing boxes and use more space. Thus, the average traffic expense per unit is raised.

SUMMARY OF THE INVENTION

The object of the present invention is to provide a foldable support for a plane display. Before packing the plane display, the support is folded to reduce packing space and traffic expense per unit.

The present invention provides a plane display with a foldable support. The plane display comprises a base and a back plane to mount the plane display panel. The back plane pivots on the base by a sleeve. The sleeve has a central hole with a connecting rod disposed within, sliding between a first position and a second position. An L-shaped member is fixed on the connecting rod. When the connecting rod is located on the first position, the L-shaped member secures the back plane to the base at a first angle. When the connecting rod is in the second position, the L-shaped member releases the back plane from the base, and the back plane can be rotated with respect to the base to a second angle.

In the above-mentioned foldable support, the sleeve has an end portion, and the connecting rod has a flange. A spring is disposed between the end portion of the sleeve and the flange of the connecting rod. The spring maintains the connecting rod fixed in the first position.

In the above-mentioned foldable support, the back plane has a first slit, and the base has a second slit. When the connecting rod is in the first position, the L-shaped member passes through the first slit and the second slit and secures the back plane to the base at the first angle.

In the above-mentioned foldable support, when the connecting rod is in the second position, the L-shaped member quits the second slit. The back plane is freed and is rotated with respect to the base to the second angle.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 6A is a schematic side view of a plane display with the support in FIG. 2 extended; and FIG. 6B is a schematic side view of a plane display with the support in FIG. 2 folded.

DETAILED DESCRIPTION OF THE INVENTION

Figure 1:
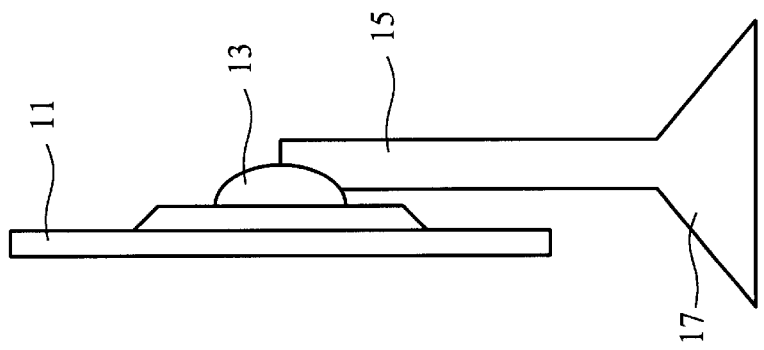
FIG. 1 is a schematic side view of a conventional plane display as referenced in the Prior Art.
Figure 2:
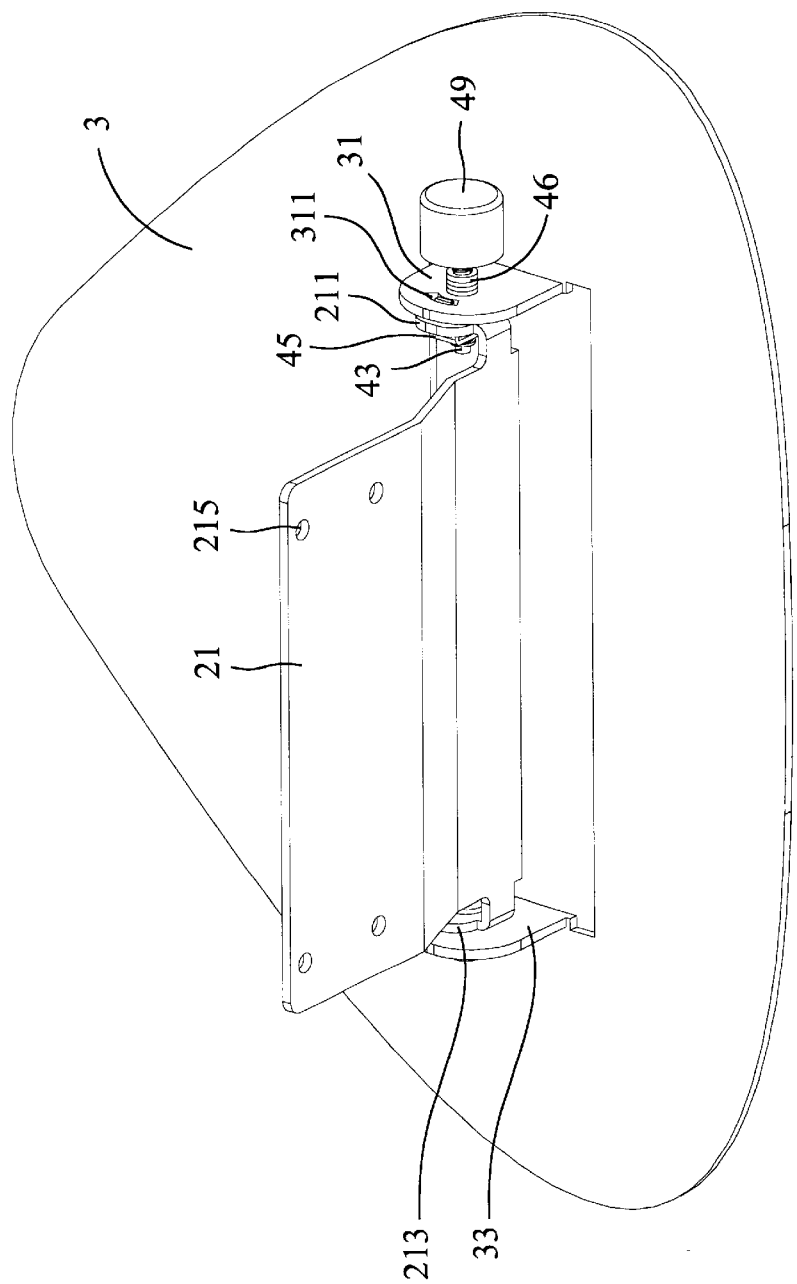
FIG. 2 is a perspective view of the foldable support of the invention.

FIG. 2 is a perspective view of the foldable support of the invention. In FIG. 2, the foldable support for a plane display of the invention includes a base 3 and a back plane 21. The back plane 21 has a plurality of screw holes 215 to mount the plane display panel (not shown). The back plane 21 has a first arm 211 and a second arm 213 respectively pivoting on a first fin 31 and a second fin 33 of the base 3. Thus, the back plane 21 can be rotated with respect to the base 3.

Figure 3:
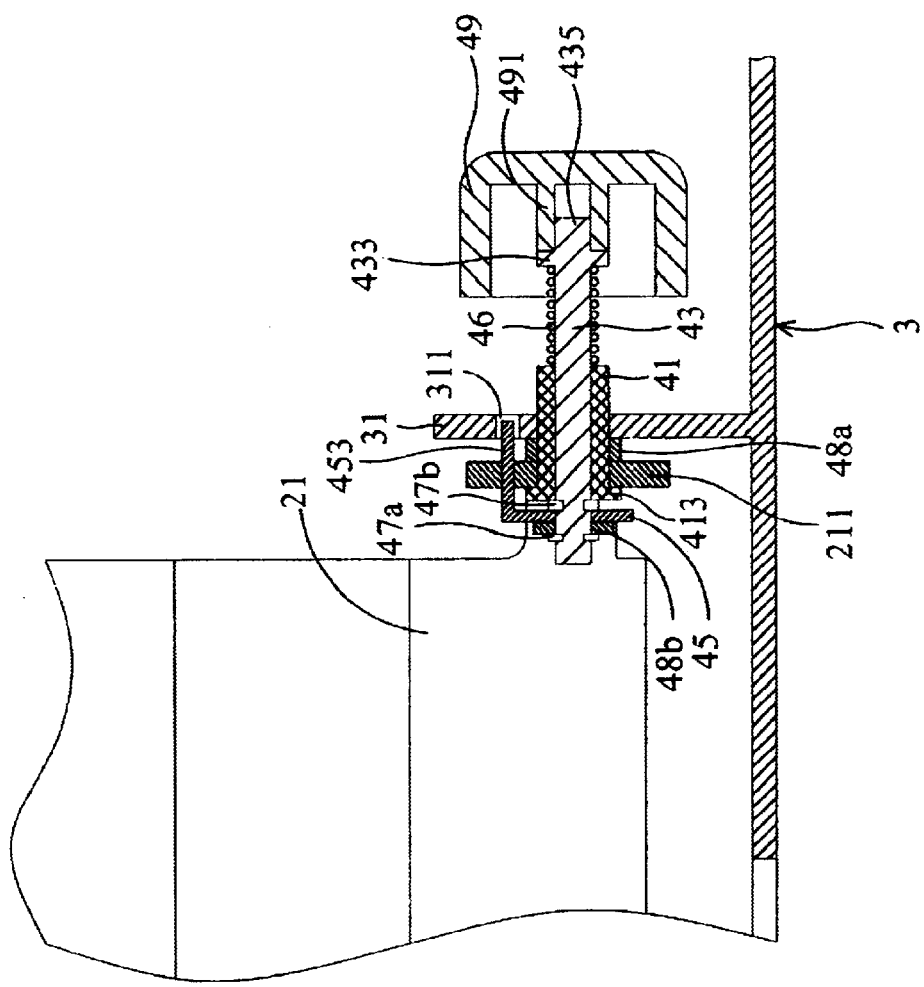
FIG. 3 is a partially enlarged cross-section of the foldable support in FIG. 2.
Figure 4:
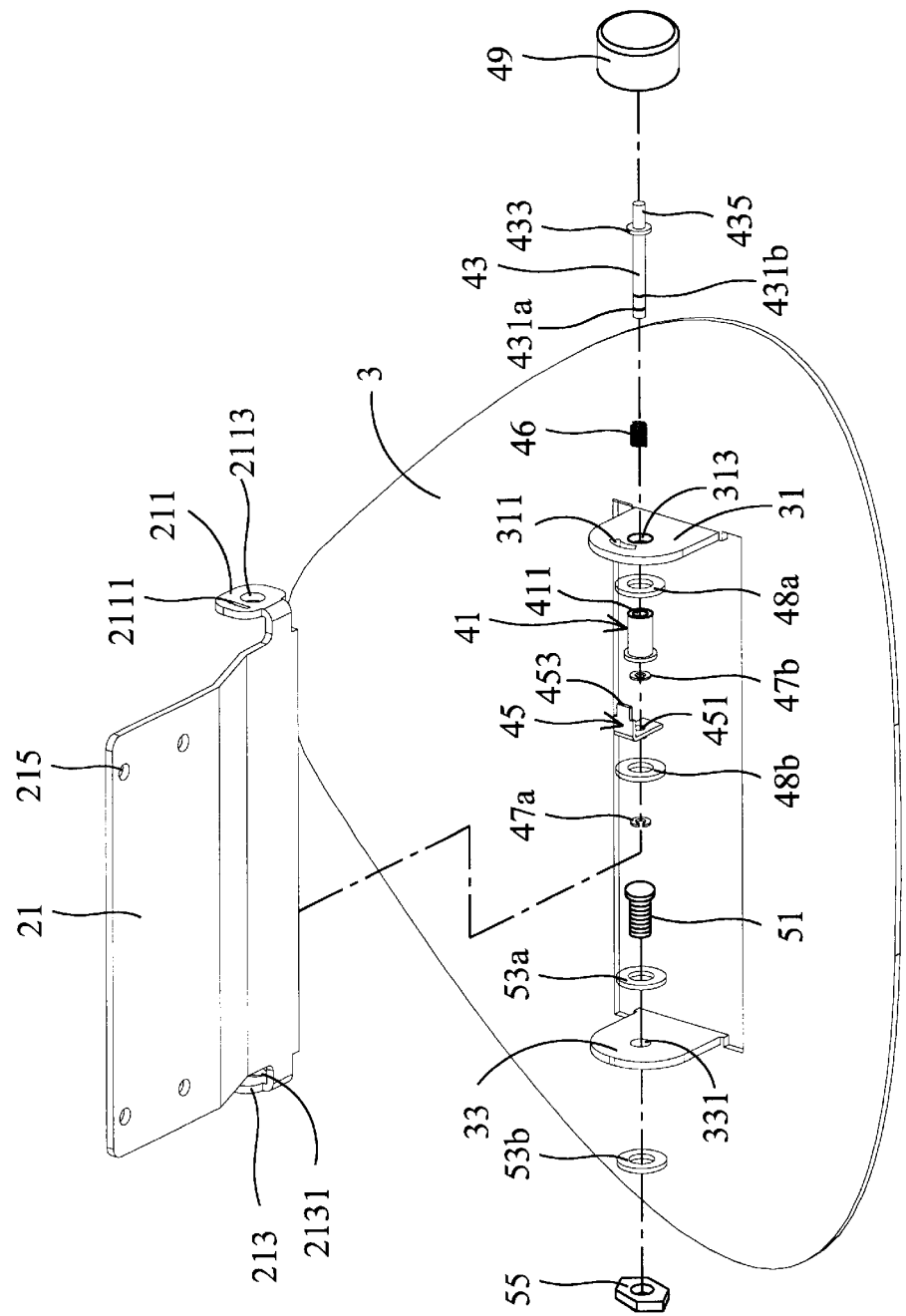
FIG. 4 is an exploded view of the foldable support of the invention.

In FIGS. 3 and 4, the first arm 211 of the back plane 21 is pivoting on the first fin 31 of the base 3 through a sleeve 41. A spacer 48a is disposed on the sleeve 41 to maintain an interval between the first arm 211 and the first fin 31. The sleeve 41 is fixed to the first arm 211 of the back plane 21 by a flange 413 at one end.

A connecting rod 43 is movably disposed in the central hole 411 of the sleeve 41. The connecting rod 43 has an end 435 with a flange 433 engaging with the bore 491 of the cap 49. A spring 46 is disposed between the right end of the sleeve 41 and the flange 433 of the connecting rod 43. The spring 46 provides an elastic force to maintain the connecting rod 43 rightward. An L-shaped member 45 is disposed at the end opposite to the flange 433 of the connecting rod 43. The L-shaped member 45 is disposed between the C-shaped buckles 47a, 47b with a spacer 48b within. Thus, the L-shaped member 45 is fixed on the connecting rod 43.

The L-shaped member 45 has a finger portion 453 and a hole 451. Because the finger portion 453 passes through the first slit 2111 of the first arm 211 and the second slit 311 of the first fin 31, the back plane 21 is fixed to the base 3 at the first angle.

In FIGS. 2 and 4, the second fin 33 of the base 3 and the second arm 213 of the back plane 21 are connected by a screw 51, spacers 53a, 53b and a nut 55. The friction for changing the inclined angle of the back plane 21 can be adjusted by adjusting the screw 51.

The second slit 311 of the first fin 31 is an arched slit limiting the finger portion 453 of the L-shaped member 45 to a predetermined range. Thus, the included angle between the back plane 21 and the base 3 can be adjusted in the predetermined range. As well, the observation angle of the plane display panel (not shown) can be changed.

Referring to FIG. 4, when assembling the foldable support, the sleeve 41 is first disposed through the hole 2113 on the first arm 211 of the back plane 21, the spacer 48a and the hole 313 on the first fin 31 of the base 3. On the other side of the back plane 21, the screw 51 is disposed through the hole 2131 on the second arm 213 of the back plane 21, the spacer 53a, the hole 331 on the fin 33 of the base 3 and the spacer 53b, and fastened by the nut 55. The connecting rod 43 is disposed through the spring 46 and the central hole 411 of the sleeve 41, and fixed by the C-shaped buckle 47b. The hole 451 of the L-shaped member 45 is aligned to the connecting rod 43, and the finger portion 453 of the L-shaped member 45 is disposed through the first slit 2111 of the first arm 211 and the second slit 311 of the first fin 31. The L-shaped member 45 is fixed on the connecting rod 43 by the C-shaped buckle 47a with the spacer 48b. Finally, the cap 49 is attached to the end 435 of the connecting rod 43, and finishing the assembly.

Figure 5:
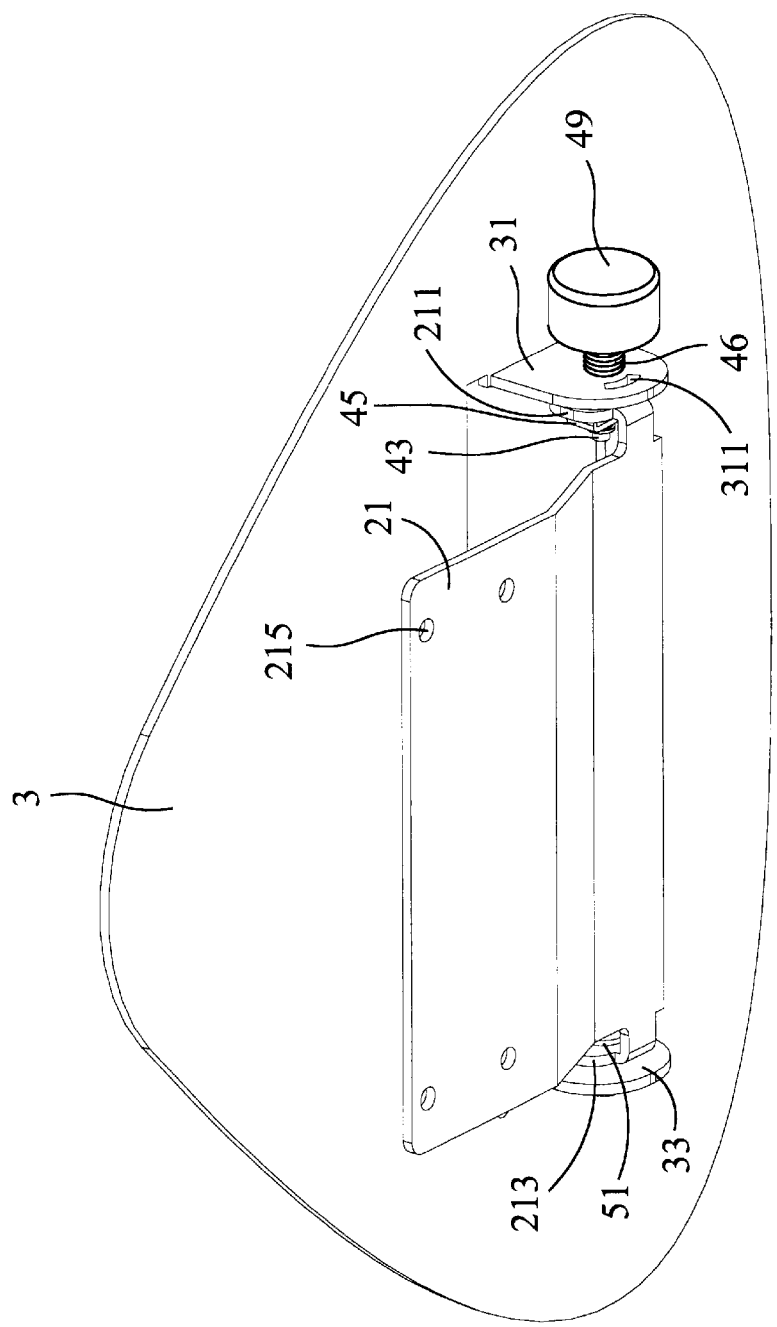
FIG. 5 is a perspective view of the support folded.

Referring to FIG. 2, when folding the foldable support of the invention, the cap 49 is pushed leftward. The connecting rod 43 moves leftward and drives the finger portion 453 of the L-shaped member 45, disengaging from the second slit 311 of the first fin 31. Therefore, the back plane 21 can be rotated with respect to the base 3 to a position shown in FIG. 5.

FIG. 6A is a schematic side view of a plane display with the support extended, and FIG. 6B is a schematic side view of a plane display with the support in FIG. 2 folded. In FIGS. 6A and 6B, the foldable support of the invention is suitable for a plane display panel 2, such as a LCD panel or a plasma display panel (PDP). When using the plane display, the observation angle can be adjusted within a predetermined range. At the same time, the base 3 uses considerable space. When packing the plane display, the cap 49 is simply pushed, and the base 3 is rotated to the position behind the plane display panel 2, shown in FIG., 6B. Accordingly, the plane display uses less space and is easily packed.

Furthermore, a smaller box can contain the plane display with the foldable support folded. The manufacturer can reduce the traffic expense per unit of the present invention.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A foldable support for a plane display panel, comprising:
   a base;
   a back plane, mounted on the plane display panel and pivoting on the base by a sleeve;
   a connecting rod, movably disposed in the sleeve and sliding between a first position and a second position; and
   an L-shaped member, fixed on the connecting rod, securing the back plane to the base at a first angle when the connecting rod is in the first position, and releasing the back plane from the base when the connecting rod is in the second position, the back plane rotating with respect to the base to a second angle.

2. The foldable support as claimed in claim 1, wherein the sleeve has an end portion, the connecting rod has a flange, a spring is disposed between the end portion of the sleeve and the flange of the connecting rod, maintaining the connecting rod in the first position.

3. The foldable support as claimed in claim 1, wherein the back plane has a first slit, the base has a second slit, and when the connecting rod is in the first position, the L-shaped member is disposed through the first slit and the second slit and secures the back plane to the base at the first angle.

4. The foldable support as claimed in claim 3, wherein when the connecting rod is in the second position, the L-shaped member disengages the second slit, and the back plane rotates with respect to the base to the second angle.

5. A plane display, comprising:
   a plane display panel;
   a base for supporting the plane display panel;
   a back plane, mounted on the plane display panel and pivoting on the base by a sleeve;
   a connecting rod, movably disposed in the sleeve and sliding between a first position and a second position; and
   an L-shaped member, fixed on the connecting rod, securing the back plane to the base at a first angle when the connecting rod is in the first position, and releasing the back plane from the base when the connecting rod is in the second position, the back plane rotating with respect to the base to a second angle.

6. The plane display as claimed in claim 5, wherein the sleeve has an end portion, the connecting rod has a flange, a spring is disposed between the end portion of the sleeve and the flange of the connecting rod, maintaining the connecting rod in the first position.

7. The plane display as claimed in claim 5, wherein the back plane has a first slit, the base has a second slit, and when the connecting rod is in the first position, the L-shaped member is disposed through the first slit and the second slit and secures the back plane to the base at the first angle.

8. The plane display as claimed in claim 7, wherein when the connecting rod is in the second position, the L-shaped member disengages the second slit, and the back plane rotates with respect to the base to the second angle.

9. A foldable support for a plane display panel, comprising:
   a base;
   a back plane, mounted on the plane display panel and pivoting on the base by a sleeve;
   a connecting rod, movably disposed in the sleeve and sliding between a first position and a second position; and
   an L-shaped member with a finger portion, fixed on the connecting rod, the finger portion engaging with the back plane and the base simultaneously to secure the back plane to the base at a first angle when the connecting rod is in the first position, and releasing the back plane from the base when the connecting rod is in the second position, the back plane rotating with respect to the base to a second angle.

10. The foldable support as claimed in claim 9, wherein the sleeve has an end portion, the connecting rod has a flange, a spring is disposed between the end portion of the sleeve and the flange of the connecting rod, maintaining the connecting rod in the first position.

11. The foldable support as claimed in claim 9, wherein the back plane has a first slit, the base has a second slit, and when the connecting rod is in the first position, the L-shaped member is disposed through the first slit and the second slit and secures the back plane to the base at the first angle.

12. The foldable support as claimed in claim 11, wherein when the connecting rod is in the second position, the L-shaped member disengages the second slit, and the back plane rotates with respect to the base to the second angle.

13. A plane display, comprising:
    a plane display panel;
    a base for supporting the plane display panel;

a back plane, mounted on the plane display panel and pivoting on the base by a sleeve;

a connecting rod, movably disposed in the sleeve and sliding between a first position and a second position; and an L-shaped member with a finger portion, fixed on the connecting rod, the finger portion engaging with the back plane and the base simultaneously to secure the back plane to the base at a first angle when the connecting rod is in the first position, and releasing the back plane from the base when the connecting rod is in the second position, the back plane rotating with respect to the base to a second angle.

14. The plane display as claimed in claim 13, wherein the sleeve has an end portion, the connecting rod has a flange, a spring is disposed between the end portion of the sleeve and the flange of the connecting rod, maintaining the connecting rod in the first position.

15. The plane display as claimed in claim 13, wherein the back plane has a first slit, the base has a second slit, and when the connecting rod is in the first position, the L-shaped member is disposed through the first slit and the second slit and secures the back plane to the base at the first angle.

16. The plane display as claimed in claim 13, wherein when the connecting rod is in the second position, the L-shaped member disengages the second slit, and the back plane rotates with respect to the base to the second angle.

\* \* \* \* \*